United States Patent [19]

Sossong

[11] 3,945,539

[45] Mar. 23, 1976

[54] METHOD AND APPARATUS FOR EXPELLING FLUIDS

[75] Inventor: Henry J. Sossong, Rockaway, N.J.

[73] Assignee: Thiokol Corporation, Newtown, Pa.

[22] Filed: Aug. 16, 1966

[21] Appl. No.: 574,492

[52] U.S. Cl. .............................................. 222/386.5
[51] Int. Cl.² ............................................. B67D 5/04
[58] Field of Search .......... 222/95, 386.5; 239/323; 158/50.1

[56] References Cited
UNITED STATES PATENTS

| | | | |
|---|---|---|---|
| 3,070,265 | 12/1962 | Everett | 222/386.5 |
| 3,145,884 | 8/1964 | Everett | 222/386.5 |
| 3,471,349 | 10/1969 | Cohen et al. | 222/386.5 |

*Primary Examiner*—Verlin R. Pendegrass

[57] ABSTRACT

Disclosure is directed to an apparatus for expelling liquid fuel from a tank in a rocket engine comprising a flexible bladder which closely fits the walls of the tank and is bonded thereto by an adhesive with a force greater than the force required to flex the bladder to progressively peel the bladder from the tank wall as it is flexed and rolled by a motive fluid to displace the liquid therefrom.

6 Claims, 3 Drawing Figures

INVENTOR.
HENRY J. SOSSONG

BY

Curtis, Morris + Safford

ATTORNEYS

METHOD AND APPARATUS FOR EXPELLING FLUIDS

This invention relates to a method of and apparatus for positively displacing a fluid from a container and more particularly to an expulsion system utilizing a diaphragm or bladder attached to the inner surface of a liquid containing tank and actuated through the tank by a propellant gas under pressure to expel stored fluid therefrom.

Bladders of this general type are particularly useful in expulsion systems for rocket engines having packaged liquid propellants, but their usefulness has been limited for various reasons chief among which is the fact that the pressure which acts on the bladder to start the expulsion of the liquid, acts at the same time on the entire bladder surface. This pressure distribution is apt to move the entire surface of the bladder away from the walls of the tank and makes it impossible to predict the exact movement of liquid and hence the center of gravity of the tank during expulsion. Moreover, complete expulsion of the liquid may not be effected due to the collapse of remote portions of the bladder around the outlet before a reversal of the adjacent portion of the bladder has been completed.

Accordingly, the main object of the present invention is to provide an improved method of and apparatus for the positive expulsion of fluid which will obviate the above and other limitations of known systems.

Another important object of the present invention is to provide an improved positive expulsion apparatus having a liquid expulsion bladder whose expulsion movement is predictable and which will eliminate the collapse or buckling of the bladder in irregular folds to permit complete expulsion of the liquid.

Still another important object of the present invention is to provide an improved positive expulsion apparatus in which the bladder is progressively peeled from the wall of a tank by the pressurizing gas during liquid expulsion in a controlled and predictable manner.

These and other objects and advantages of the invention will become more apparent from the following description. It will be understood, however, that the drawings are for the purpose of illustration, only, and are not a definition of the limits of the invention reference being had for this purpose to the appended claims.

IN THE DRAWINGS

Figure 1:
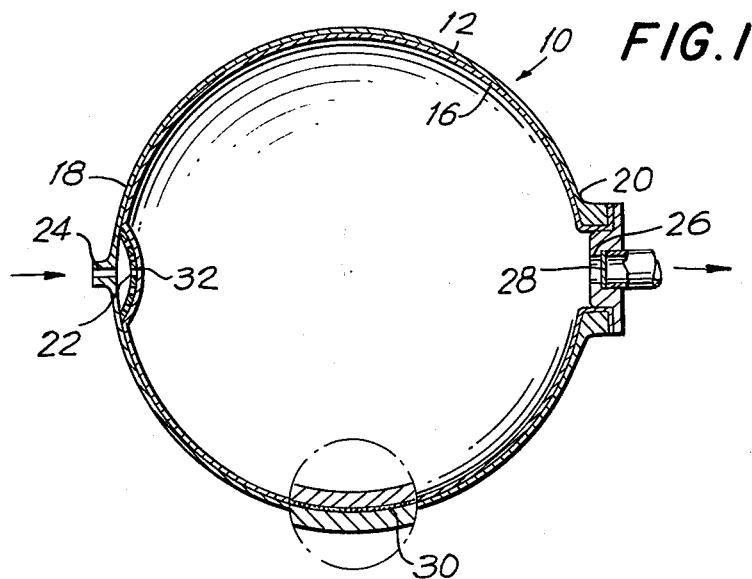
FIG. 1 is a sectional view of a liquid expulsion apparatus incorporating the novel features of the present invention and showing a tank for storing liquid to be expelled and the bladder bonded to the wall of the tank.
Figure 2:
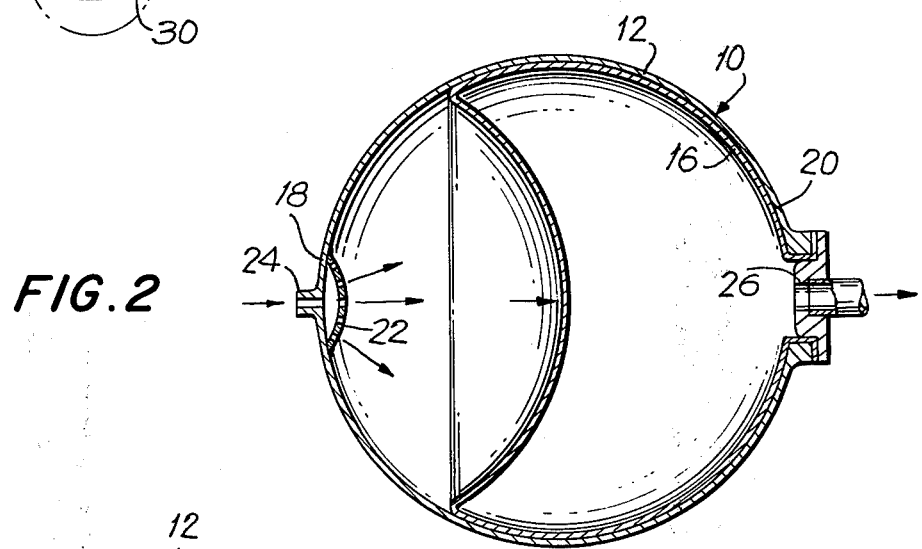
FIG. 2 is a similar view showing the position and shape of the bladder midway of a liquid expulsion step.

Referring to the drawing, the reference character 10 designates a liquid expulsion apparatus as a whole comprising a tank 12 which may be cylindrical, or spherical as shown, and a bladder 16. The tank may be constructed of a material having considerable strength, such as stainless steel, so that it may be made thin and have a minimum weight, but which may be incompatible with the fluid being stored, such as a liquid propellant. The bladder also may comprise a thin sheet metal foil, such as aluminum, which is compatible with the liquid being stored.

One side 18 of the tank 12 is provided with a pressurizing inlet 24 for the admission of a gas or other pressurizing medium into the tank to act on the bladder 16 and force it through the tank to abut the other diametrically opposite side 20 of the tank. The liquid or other fluid filling the tank 12 to the right of the bladder 16 is expelled through a discharge port 26 which may be provided with a burst disc, etc. 28. The pressurizing inlet 24 is provided with a spherically shaped, perforate diffuser plate 22 which is suitably secured to the tank as by welding.

Figure 3:
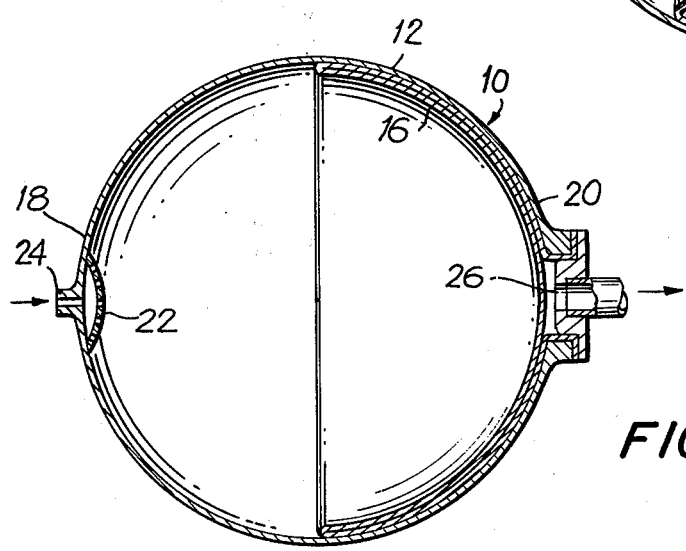
FIG. 3 is a similar view showing the bladder completely moved through the tank at the end of the liquid expulsion step.

In accordance with the present invention, the movement of the bladder 16 from left to right, as shown, is controlled and made predictable by initially bonding the bladder to the wall of the tank with a suitable bonding agent 30 applied over the entire outer surface of the bladder 16 except in the area of the perforate diffuser plate 22. A bonding agent 30 should be selected which will bond the bladder 16 to the wall of the tank 12 with an adhesive force greater than the force required to deform and move the bladder from the position shown in FIG. 1 to that shown in FIG. 3, and less than the force required to tear the bladder material. For example, such a bonding material 30 may require a force of fifty pounds per square inch to flex, deform and bend the bladder from the position shown in FIG. 1 to that shown in FIG. 3, which force may be divided into an adhesive sealing force of 39 pounds per square inch and an actual bending force of only 11 pounds per square inch when the bladder material used has a resistance to tearing or a yield force of 350 pounds per square inch. Suitable bonding materials which have been used successfully in bonding bladders of aluminum foils of from 0.020 inches to 0.060 inches thickness to the wall of stainless steel tanks are synthetic rubber compounds such as "Silastic" No. 140 as manufactured by Dow Corning Chemical Co. and "R.T.V. 510" as manufactured by General Electric Co. After proper curing or setting which may be effected by heat, pressure, etc., the bonding agent 30 provides an integral assembly except in the area of the diffuser plate 22 which forms a spherical depression 32 in the bladder in its contact therewith.

In the operation, a pressurizing medium such as gas is directed into the inlet 24 where it flows through the diffuser plate 22 and exerts a force on the spherical depression 32 of the bladder 16. As the force of the pressurizing medium is applied, the bladder will tend to retain the spherical depression since it will act as a membrane.

As the spherical depression 32 of the bladder 16 moves (to the right as shown) toward the diametrically opposite discharge port 26 to expel the liquid therethrough when the built-up pressure bursts the disc 28, the movement applies a force on the bladder greater than the adhesive force of the bonding agent 30 resulting in a peeling action of the bladder from the wall of the tank. The bladder 16 peels evenly from the tank wall with the spherical depression 32 always extending toward the tank wall at the opposite side and thus growing larger until it completely reverses itself and contacts the discharge outlet 26 and completely overlies the unpeeled bladder portion to effect complete expulsion of the liquid.

Thus, the bonding agent acts as both a controlled restraining force and a pressure seal preventing the pressurizing medium from seeping between the tank and the bladder to collapse it, and the apparatus comprises a controlled and predictable expulsion system.

It is to be understood that the form of the invention herewith shown and described is to be taken as a preferred example of the same and that various changes in the shape, size and arrangement of parts may be restored to without departure from the spirit of the invention or the scope of the subjoined claims.

I claim:

1. In an apparatus for storing and delivering a fluid, the combination of a tank for storing the fluid and having inlet and outlet ports at opposite sides thereof, a flexible bladder attached to the tank between the inlet and outlet ports and of an area to closely fit the wall of said tank, said flexible bladder being movable by a pressure fluid supplied through the inlet from a position where it conforms with one side of the tank to a position where it conforms with the other side of the tank to eject fluid from the tank, and a bonding material adhesively bonding the bladder to the tank wall with a force greater than the force required to flex the bladder whereby to progressively peel the bladder from the tank wall as the bladder is flexed.

2. The combination recited in claim 1 wherein a perforated diffuser plate is provided on the tank wall which projects outwardly therefrom to initially shape said bladder and facilitate said initial peeling action of said bladder.

3. The combination recited in claim 1 wherein said tank is spherical.

4. The combination recited in claim 3 wherein a depression is formed in said bladder by contact with said diffuser plate to facilitate the peeling back action of said bladder.

5. The combination recited in claim 4 wherein said diffuser plate is spherical.

6. An expulsion device comprising: a container, inlet means for introduction of a first fluid into said container, an outlet for expulsion of a second fluid from said container, a thin metal diaphragm separating said first and second fluids, said diaphragm being bonded over substantially its entire surface to the interior of said container, whereby said diaphragm will peel from said container smoothly when said second fluid is expelled through said outlet in response to said first fluid being introduced into said container.

* * * * *